(12) United States Patent
Copeland et al.

(10) Patent No.: US 8,055,270 B1
(45) Date of Patent: Nov. 8, 2011

(54) SYSTEM AND METHOD FOR PROVIDING LOCATION INFORMATION FOR A MOBILE HANDSET

(75) Inventors: Jeanette Christine-Deason Copeland, West Bloomfield, MI (US); Stalin Albanes, Atlanta, GA (US); Herbert R. Cantrell, Kennesaw, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 456 days.

(21) Appl. No.: 11/318,367

(22) Filed: Dec. 23, 2005

(51) Int. Cl.
*H04W 24/00* (2009.01)

(52) U.S. Cl. .................. 455/456.1; 455/432.1; 455/433; 455/404.2; 455/440

(58) Field of Classification Search ........ 455/456.1–457
See application file for complete search history.

(56) References Cited

U.S. PATENT DOCUMENTS

| | | | |
|---|---|---|---|
| 6,097,336 A | 8/2000 | Stilp | |
| 6,236,365 B1 | 5/2001 | LeBlanc et al. | |
| 6,249,252 B1 | 6/2001 | Dupray | |
| 6,282,427 B1 * | 8/2001 | Larsson et al. | 455/456.2 |
| 6,285,321 B1 | 9/2001 | Stilp et al. | |
| 6,373,833 B1 | 4/2002 | Suonvieri et al. | |
| 6,385,452 B1 * | 5/2002 | Zadeh et al. | 455/440 |
| 6,603,976 B1 * | 8/2003 | Amirijoo et al. | 455/456.1 |
| 6,952,181 B2 | 10/2005 | Karr et al. | |
| 6,985,839 B1 | 1/2006 | Motamedi et al. | |
| 7,327,980 B2 * | 2/2008 | Hepsaydir | 455/11.1 |
| 7,474,896 B2 * | 1/2009 | Mohi et al. | 455/456.1 |
| 2001/0041575 A1 * | 11/2001 | Amirijoo et al. | 455/456 |
| 2002/0005804 A1 * | 1/2002 | Suprunov | 342/457 |
| 2003/0146871 A1 | 8/2003 | Karr et al. | |
| 2003/0222820 A1 | 12/2003 | Karr et al. | |
| 2004/0176109 A1 * | 9/2004 | Niemenmaa | 455/456.5 |
| 2004/0176110 A1 * | 9/2004 | Kauhanen | 455/456.5 |
| 2004/0203539 A1 * | 10/2004 | Benes et al. | 455/101 |
| 2004/0259565 A1 * | 12/2004 | Lucidarme | 455/453 |
| 2005/0068229 A1 * | 3/2005 | Moilanen et al. | 342/357.15 |
| 2005/0090244 A1 * | 4/2005 | Ammi et al. | 455/423 |
| 2005/0148346 A1 * | 7/2005 | Maloney et al. | 455/456.6 |
| 2007/0202885 A1 * | 8/2007 | Kennedy et al. | 455/456.1 |

* cited by examiner

*Primary Examiner* — Dai A Phuong

(57) ABSTRACT

A system that facilitates determination of a location of a mobile handset. The system includes three or more location measurement units that each correspond to a sector of the cell site. The location measurement units transmit location related information to a computation component. The computation component receives the location related information and performs a triangulation calculation on the information o define the location of the mobile handset.

27 Claims, 7 Drawing Sheets

SYSTEM AND METHOD FOR PROVIDING LOCATION INFORMATION FOR A MOBILE HANDSET

BACKGROUND

Cellular telephone manufactures strive to continually provide new and innovative services in an attempt to keep existing customers and draw in new customers in an industry that is already very competitive. Location based services enable personalized services to be offered based on a person's (or item of the person) location. Services include, for example, areas of security, E911 services, selective advertising services, fleet and resource management, location based information, vehicle tracking, person-to-person location, and messaging applications.

Location-based information services allow subscribers to access information for which the information is filtered and tailored based on the location of the requesting user. Service requests may be initiated on demand by subscribers, or automatically, when triggering conditions are met, and may be a singular request or result in periodic responses. Examples of location based information services include the following: navigation to guide the user to his or her destination; city sightseeing to describe historical sights, find restaurants, the airport, bus terminal, etc.; location dependent content broadcast, that support broadcasting content to a user in a certain geographical area; and, mobile yellow pages, for finding telephone numbers and addresses, for example.

Additionally, federal law requires that all Personal Communications System networks and mobile communications networks be capable of providing location information for wireless calls made to emergency services. Under Phase II of the Federal Communications Commission wireless E911 mandate, it is required that technology be in place such that a dispatcher can know more precisely where the caller is located, a capability called Automatic Location Information.

One method of determining the location of a wireless caller is by Time Difference of Arrival (TDOA) technology. The TDOA technique works based on triangulation by measuring the time of arrival of a mobile station radio signal at three or more separate cell sites. In a cellular system using TDOA, a caller will place a call that is received at several base station transceivers (BTS), although only one BTS is assigned by the network to provide cellular communications service to the caller. A BTS is part of a BSS (Base Station Subsystem), which BSS includes the BTS and a BSC (Base Station Controller). Each BTS receiving the call signal will pass it through the BSC to a MSC (Mobile Switching Center).

The MSC is part of an NSS (Network and Switching Subsystem), and is a cellular central office that can perform all switching and signaling for cellular telephones in the MSC's area by routing calls between the mobile network and the fixed telephone network (e.g., the PSTN-Public Switched Telephone Network). TDOA equipment at the MSC will determine the difference in time that the signal arrived at each of three or more BTS sites and calculate the latitude and longitude of the caller based on the time difference and triangulation. The MSC then forwards the call, along with the caller's location, to the requestor.

One current method of implementing TDOA location technology in wireless networks requires that the BTS have the capability to determine timing information for received signals. In support thereof, a Wireless Location Sensor (WLS) can be located at each BTS. The WLS measures features of the wireless mobile station radio signals and transmits the call signal information to a Geolocation Control System (GCS) that is also located at the MSC. The GCS is a central location processor that manages, coordinates, and administers the WLS network. The GCS converts the radio signal information received from the WLS into latitude/longitude data and communicates the data to the PSAP for deployment of services. However, providing a WLS at each BTS is very expensive due to equipment, installation, and maintenance costs.

Another method of location measurement requires a large number of existing cell sites. In this method, at least 5-10 mathematical contributors are needed to get an accurate measurement for location determination. Accuracy is not significantly improved with over 10 mathematical contributors. The mathematical contributors utilize TDOA technology and take measurements of the timing differences between signals received at each of the cell sites to triangulate the mobile subscriber's position. Accordingly, this method is only useful in suburban areas where a large concentration of cell sites exist. Sparsely populated areas, where there are limited cell sites have no accurate means of determining the location of a wireless caller.

Accordingly, there is an unmet need for an improved wireless caller location system for use in sparsely populated areas, as well as suburban areas. Such a system will give accurate readings of location measurements without the need for additional cell sites and is cost effective with updating and replacing existing structures.

SUMMARY

The following presents a simplified summary in order to provide a basic understanding of some aspects of the claimed subject matter. This summary is not an extensive overview, and it is not intended to identify key/critical elements of the claimed subject matter or to delineate the scope thereof. Its sole purpose is to present some concepts in a simplified form as a prelude to the more detailed description that is presented later.

Disclosed herein are systems, methods, apparatuses, and articles of manufacture that facilitate determination of a location of a mobile handset. In more detail, it may be desirable to accurately determine the location of a mobile handset. Conventionally, however, there has been no implementation of a system or method to accurately undertake such action, especially in sparse regions where cell sites are limited. In accordance with one aspect described herein, three or more location measurement units (LMU) are provided. Each of the LMUs corresponds to a sector of the cell site(s). The LMUs collect location related information from the mobile handset. The location related information is then transmitted to a computation component that approximates the location of the mobile handset. Once the location related information is received, the computation component performs a triangulation calculation on the location related information to determine the location of the mobile handset. Accordingly, the location of a mobile handset can be accurately identified even in sparse regions where cell sites are limited.

In another example, the LMUs communicate with a base station controller (BSC) to calculate the location of a mobile handset. The LMUs communicate with the BSC by way of microwaves and transmit the location related information to the BSC. The BSC utilizes the computation component to calculate latitude and longitude data that is employed to determine the location of the mobile handset.

In another aspect described in greater detail herein, the location related information is associated with time difference of arrival (TDOA) technology. LMUs positioned at three or more separate cell sites provide uplink capability and act as data points to measure the time of arrival of a mobile handset radio signal. These measurements are then transmitted as location related information to the computation component to triangulate the location of the mobile handset.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
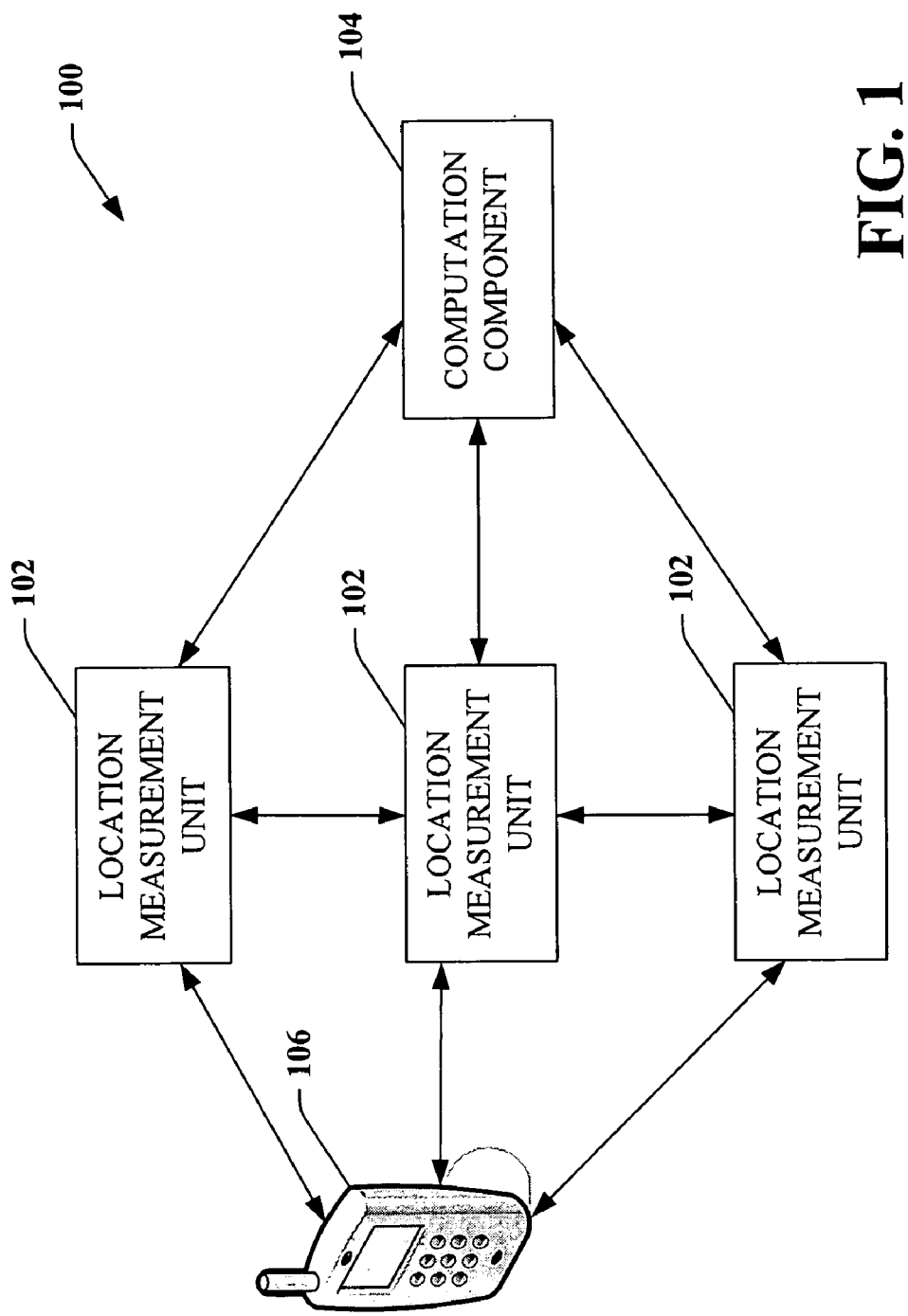
FIG. 1 illustrates a system that facilitates determination of a location of a mobile handset.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computing device, such as a mobile handset, to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The wireless caller location system overlays standard cellular networks to provide location services in sparsely populated areas, as well as suburban areas. Such a location system produces accurate readings of location measurements without the need for additional cell sites. Significant costs associated with such location systems can be reduced by adding a location measurement unit (LMU) per sector. By providing additional LMUs to already existing cell sites, the location system need not add additional cell sites to provide accurate location information for mobile handsets. The location information is forwarded via the LMUs to the BSS (Base Station Subsystem), which includes the BTS and a BSC (Base Station Controller). A computation component at the BSC can process the radio signals received from the mobile handset and determine the subscriber's latitude/longitude data, as long as the LMUs can determine the time difference between the arriving signals from the mobile handset via Time Difference of Arrival (TDOA) technology. Once this location information is received by the BSC, the BSC triangulates this location information to obtain the location of the mobile handset. Accordingly, the location of a mobile handset can be accurately identified even in sparse regions where cell sites are limited.

When TDOA technology is employed, triangulation is used to locate the mobile handset. Thus, three or more LMUs must receive the caller signal in order for triangulation to work. Other network-based location technologies such as Enhanced Observed Time Difference (EOTD) and Angle of Arrival (AOA) may be used with the disclosed invention, as well as hybrid network-based/handset-based location technologies.

Turning now to the drawings, FIG. 1 illustrates a system 100 that facilitates determination of a location of a mobile handset 106. The system 100 includes three or more location measurement units (LMU) 102. The LMU is a small hardware component that measures timing signals from base stations within a cellular communications network. The LMUs 102 of the system 100 determine the time differences between the arriving signals from the mobile handset 106. In more detail, the LMUs 102 measure the time of arrival of a mobile handset radio signal at three or more separate cell sites. Each LMU 102 provides uplink capability and acts as a data point for the triangulation of the location of the mobile handset 106. Once the time of arrival measurements are taken, the data is programmed into an algorithm to calculate the latitude and longitude of the mobile handset 106.

The system 100 discloses the incorporation of additional LMUs 102 to existing cell sites (not shown). Typically, each cell site of the cellular communications network includes microwave transmitters and receivers for communicating with, among other entities, a base station controller(s) (BSC) and mobile handset(s). The cell sites of system 100 include cellular communications towers or existing structures. The existing structures include such structures as lighthouses, fire towers, mountains, etc. It is thus to be understood that any suitable existing structure that can be equipped with microwave transmitters and receivers for communicating with BSC(s) and mobile handset(s) is contemplated and intended to fall under the scope of the hereto-appended claims.

Each of the LMUs 102 of system 100 corresponds to the sector of at least one cell site. The cell sites of the cellular communications network are configured into a plurality of sectors or cell faces. The number of sectors is dependent on the capacity and carriers required for each cell site. Typically, the number of sectors per cell site is one, three or six sectors. In more detail, an omni cell site has a single sector that exhibits a 360 degree transmission pattern. Further, a three-sector cell site having a plurality of assigned channel frequencies is subdivided into a plurality of 120 degree sectors. A six-sector cell site having a plurality of assigned channel frequencies is subdivided into a plurality of 60 degree sectors. Accordingly, the number of sectors per cell site requires different beamwidth antennas for optimal capacity performance. Too broad a beamwidth causes interference in the network and too narrow a beamwidth induces coverage holes.

Each LMU corresponds to a sector of the cell site via direct connection or proxy. Typically, an LMU is directly connected to each sector of the cell site. However, if the LMU is coupled to a proxy, the proxy would act as an intermediary between the sector of the cell site and the LMU. Accordingly, the LMU can be accessed remotely via the proxy. For example, the LMUs would determine the time differences between the arriving signals from the mobile handset, then the proxy would receive these timing measurements from the remote LMUs and transmit the data for calculation. The data is then programmed into an algorithm to triangulate the location of the mobile handset.

The LMUs 102 of the system 100 utilize Time Difference of Arrival (TDOA) technology in calculating the location of the mobile handset 106. The TDOA technique works based on triangulation by measuring the time of arrival of a mobile handset signal at three or more separate cell sites. In a cellular system using TDOA, a caller will place a call that is received at several base station transceivers (BTS), although only one BTS is assigned by the network to provide cellular communications service to the caller. A BTS is part of a BSS (Base Station Subsystem), which BSS includes the BTS and a BSC (Base Station Controller). Each BTS receiving the call signal will pass it through the BSC to a MSC (Mobile Switching Center).

The MSC is part of an NSS (Network and Switching Subsystem), and is a cellular central office that can perform all switching and signaling for cellular telephones in the MSC's area by routing calls between the mobile network and the fixed telephone network (e.g., the PSTN-Public Switched Telephone Network). LMUs corresponding to the sectors of the cell sites will determine the difference in time that the signal arrived at each of three or more sectors. These timing measurements are defined as location related information. Location related information includes all data related to the time differences between the arriving signals from the mobile handset 106.

The LMUs 102 transmit the location related information to a computation component 104. The computation component 104 approximates the location of the mobile handset 106 by way of receiving the location related information and performing a triangulation calculation on the location related information. In more detail, each LMU 102 provides uplink capability and acts as a data point for the triangulation of the location of the mobile handset 106. Once the time of arrival measurements are taken, the computation component 104 programs the data into an algorithm to calculate the latitude and longitude of the mobile handset 106 based on the time difference and triangulation.

Figure 2:
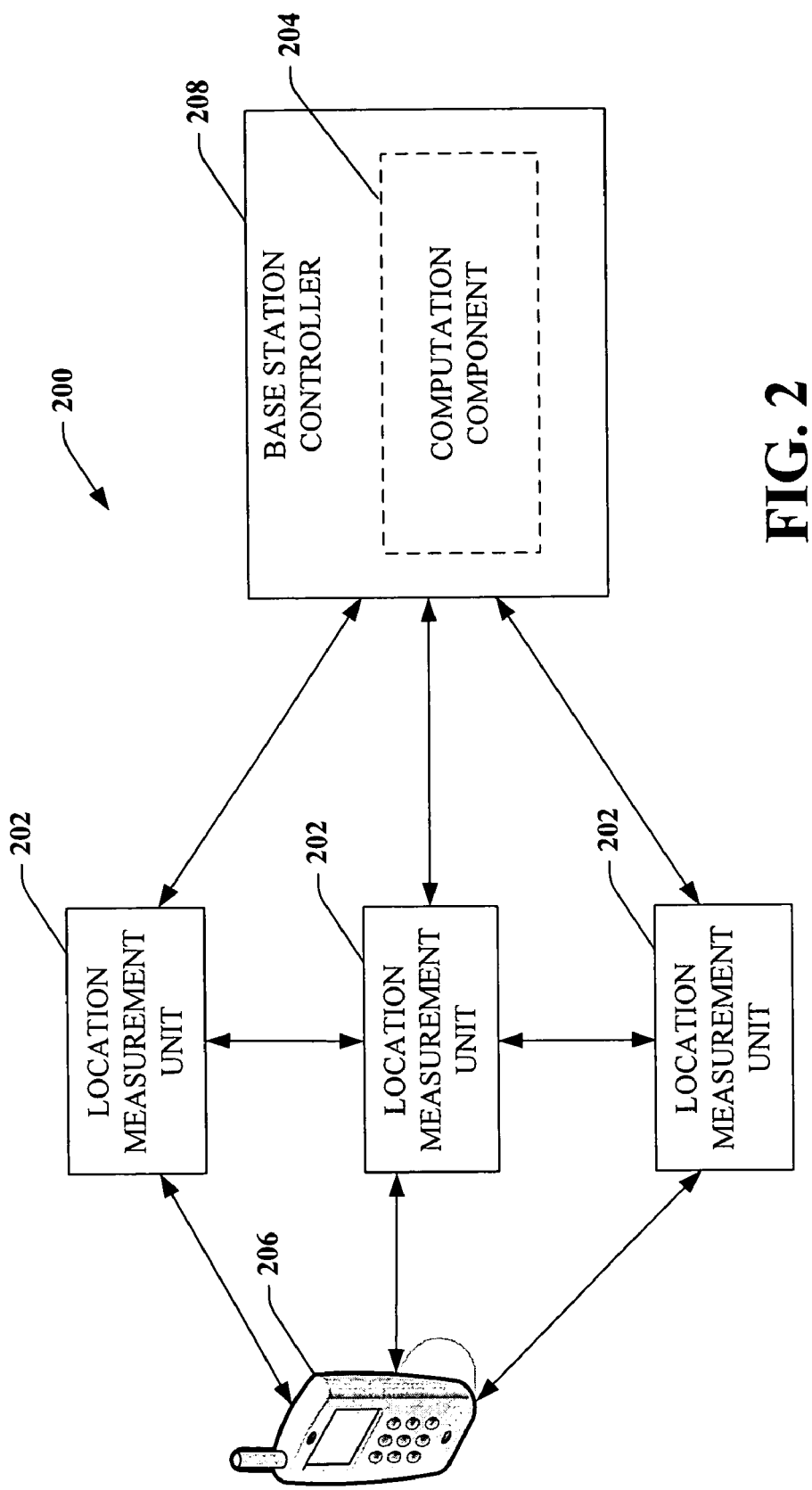
FIG. 2 illustrates a location system, wherein a base station controller (BSC) communicates with the location measurement units to define the location of the mobile handset.

FIG. 2 illustrates the system 200 wherein the LMUs 202 transmit the location related information to a base station controller (BSC) 208. A BSC 208 is part of a BSS (Base Station Subsystem), which BSS includes the BSC 208 and a BTS (Base Transceiver Station). The BSC 208 communicates with the BTS. The BTS contains transceivers, antennas and other equipment for encrypting and decrypting communications between the BSC 208 and the BTS. Typically, BSCs 208 are distributed in regions near their BTS's.

Further, the BSC 208 communicates with the LMUs 202 to analyze the location related information. As described in detail above, the LMUs 202 utilize TDOA technology in calculating the location of the mobile handset 206. LMUs 202 corresponding to the sectors of the cell sites will determine the difference in time that the mobile handset's signals arrived at each of three or more sectors. This location related data is then transmitted to the computation component 204 by way of the BSC 208. Typically, the LMUs 202 communicate with the BSC 208 by way of microwaves, however, the LMUs 202 can communicate with the BSC 208 by way of any other suitable means known in the art.

The BSC 208 utilizes the computation component 204 to calculate latitude and longitude data that defines the location of the mobile handset 206. The computation component 204, described in detail above, approximates the location of the mobile handset 206 by way of receiving the location related information and performing a triangulation calculation on the location related information. Each LMU 202 acts as a data point for the triangulation of the location of the mobile handset 206. Once the time of arrival measurements are taken, the location related information is transmitted to BSC 208. The BSC 208 utilizes the computation component 204 to program the data into an algorithm that calculates the latitude and longitude of the mobile handset 206 based at least in part on the time difference and triangulation.

The LMUs 202 of system 200 use TDOA technology in calculating the location of the mobile handset 206. The TDOA technique works based on triangulation by measuring the time of arrival of a mobile handset signal at three or more separate cell sites. In a cellular system using TDOA, a caller will place a call that is received at several BTS's, although only one BTS is assigned by the network to provide cellular communications service to the caller. LMUs 202 corresponding to the sectors of the cell sites will determine the difference in time that the signal arrived at each of three or more sectors. These timing measurements, also defined as location related information, are transmitted to a computation component 204 to perform a triangulation calculation on the data. The BSC 208 then utilizes the computation component 204 to calculate latitude and longitude data that defines the location of the mobile handset 206. Although use of TDOA technology is disclosed, other network-based location technologies such as Enhanced Observed Time Difference (EOTD) and Angle of Arrival (AOA) may be used with the disclosed invention, as well as hybrid network-based/handset-based location technologies. It is thus to be understood that any suitable technology for computing location related information from an LMU is contemplated and intended to fall under the scope of the hereto-appended claims.

Further, since the location system 200 utilizes LMUs 202 corresponding to each sector of the cell sites as data points to triangulate the location of a mobile handset 206, the need for additional cell sites is removed. Instead, the LMUs 202 microwave their output data back to antennas (not shown) at the same cell site or to antennas at different cell sites. Accordingly, the LMUs 202 act as data points for the triangulation calculation, and this data is then transmitted to the BSC 208 for determination of the location of the mobile handset 206. Accordingly, LMUs 202 may reside at great distances from each other and still be able to obtain an accurate location measurement for a mobile handset 206. For example, LMUs 202 on a particular cell site may reside at 0.5 miles or 1.0 mile from each other. This allows the accurate determination of location of a mobile handset 206 even in sparse regions that do not include a lot of cell sites.

Figure 3:
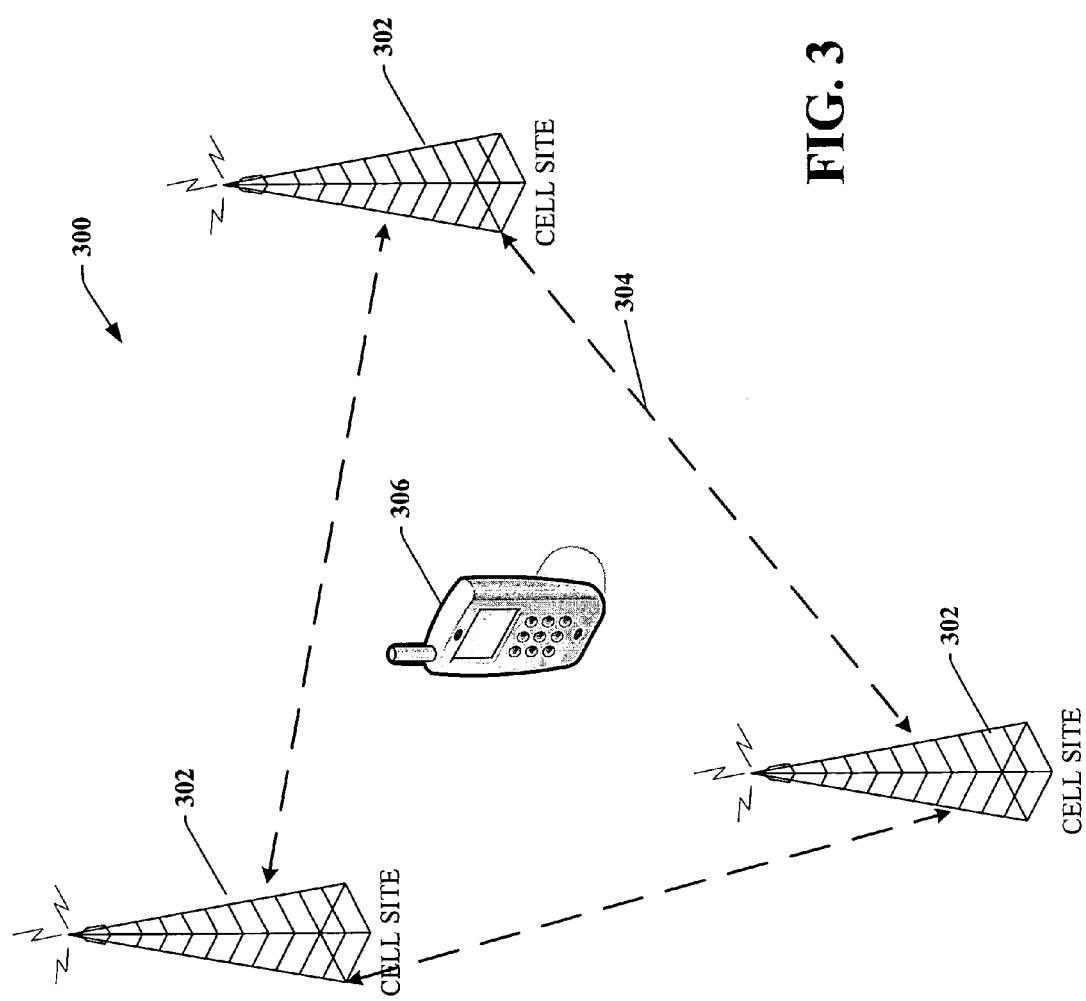
FIG. 3 illustrates an exemplary location system, wherein three cell sites triangulate the location of a mobile handset by way of location measurement units.

To better illustrate operability of the system 200, a detailed example 300 of one particular utilization of such system 200 is provided herein. This example 300, however, is meant to aid in understanding of the system 200 and is not intended to limit use or operability of such system 200. As shown in FIG. 3, three cell sites 302 located in a sparse region are positioned approximately one mile from each other with line of site in a triangular position. Communication towers are depicted as the cell sites 302 but these could be existing structures, such as lighthouses, fire towers, mountains, etc., as discussed above. Each cell site 302 comprises three sectors and is equipped with three LMUs. Each of the LMUs corresponds to one of the sectors. The three sectors facing each other each exhibit a 120 degree transmission pattern facing each of the other two cell sites, with a one mile line of site between each sector. Thus, the three cell sites 302 form a triangle of coverage 304, wherein a mobile handset 306 anywhere within the boundaries of this triangle 304 could be located. Further, each LMU corresponding to each sector provides uplink capability for obtaining location related information for the mobile handset 306. In more detail, each LMU provides uplink capability and acts as a data point for the triangulation of the location of the mobile handset 306. Utilizing TDOA technology, each LMU measures the time delays of signals from the mobile handset 306 to the LMU, the LMU then transmits these measurements via microwaves to the BSC (not shown). The BSC then utilizes a computation component to perform a triangulation calculation to determine the latitude and longitude data that defines the location of the mobile handset 306.

In operation, when a mobile subscriber utilizes his/her mobile handset 306 within the boundaries of the communication triangle 304, LMUs corresponding to the sectors of the cell sites 302 provide uplink capability which measures the time delays of signals from the mobile handset 306. The LMUs microwave their output data back to antennas at the same cell site or to antennas at different cell sites. Accordingly, the LMUs act as data points for the triangulation calculation, and this data is then transmitted to the BSC for determination of the location of the mobile handset 306. The LMUs transmit this location related information via microwaves to the BSC which utilizes a computation component to perform a triangulation calculation to determine the latitude and longitude data that defines the location of the mobile handset 306 within the boundary of the triangle 304.

Figure 4:
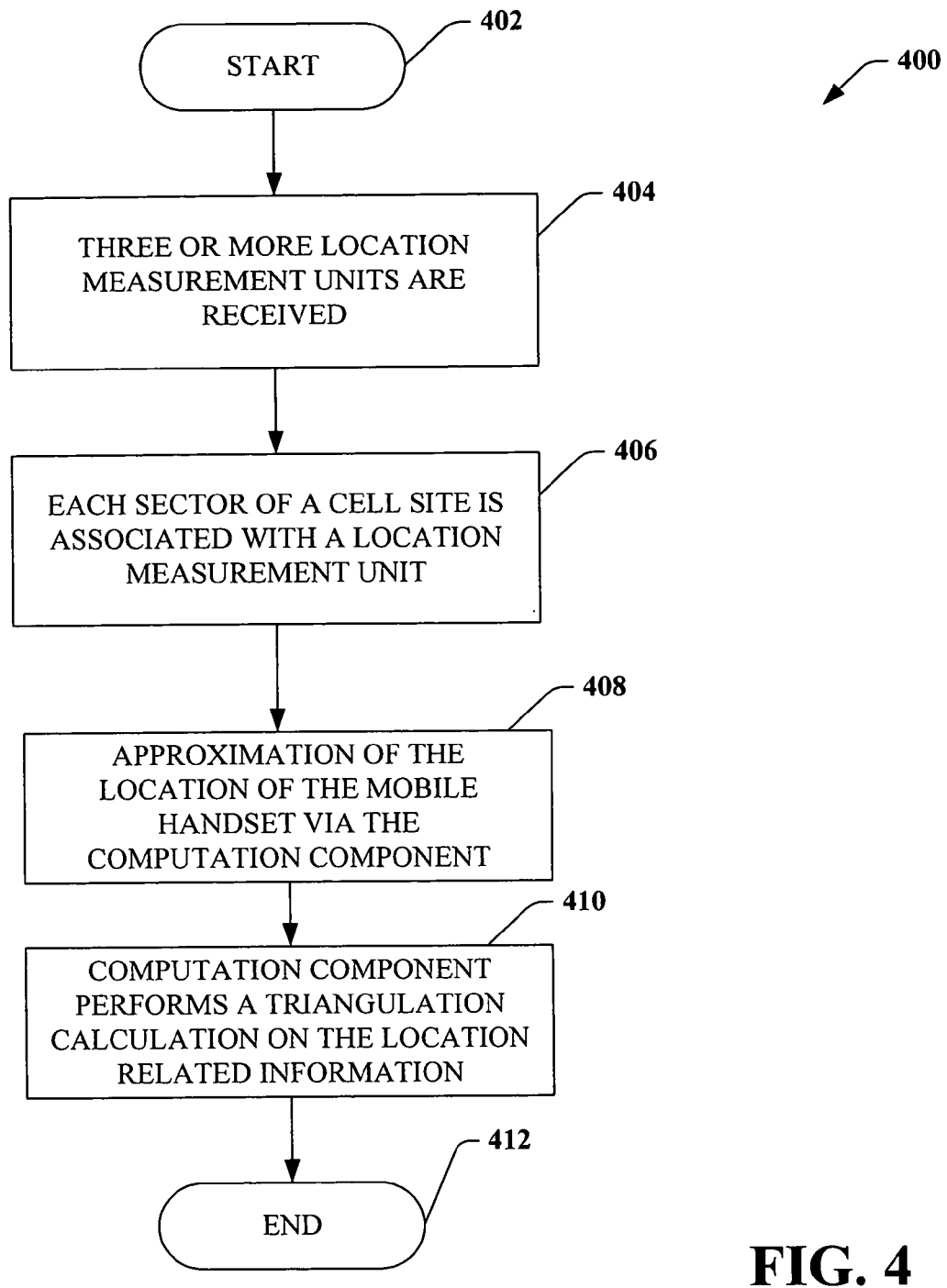
FIG. 4 is a flow diagram that is representative of a methodology for a location system.
Figure 5:
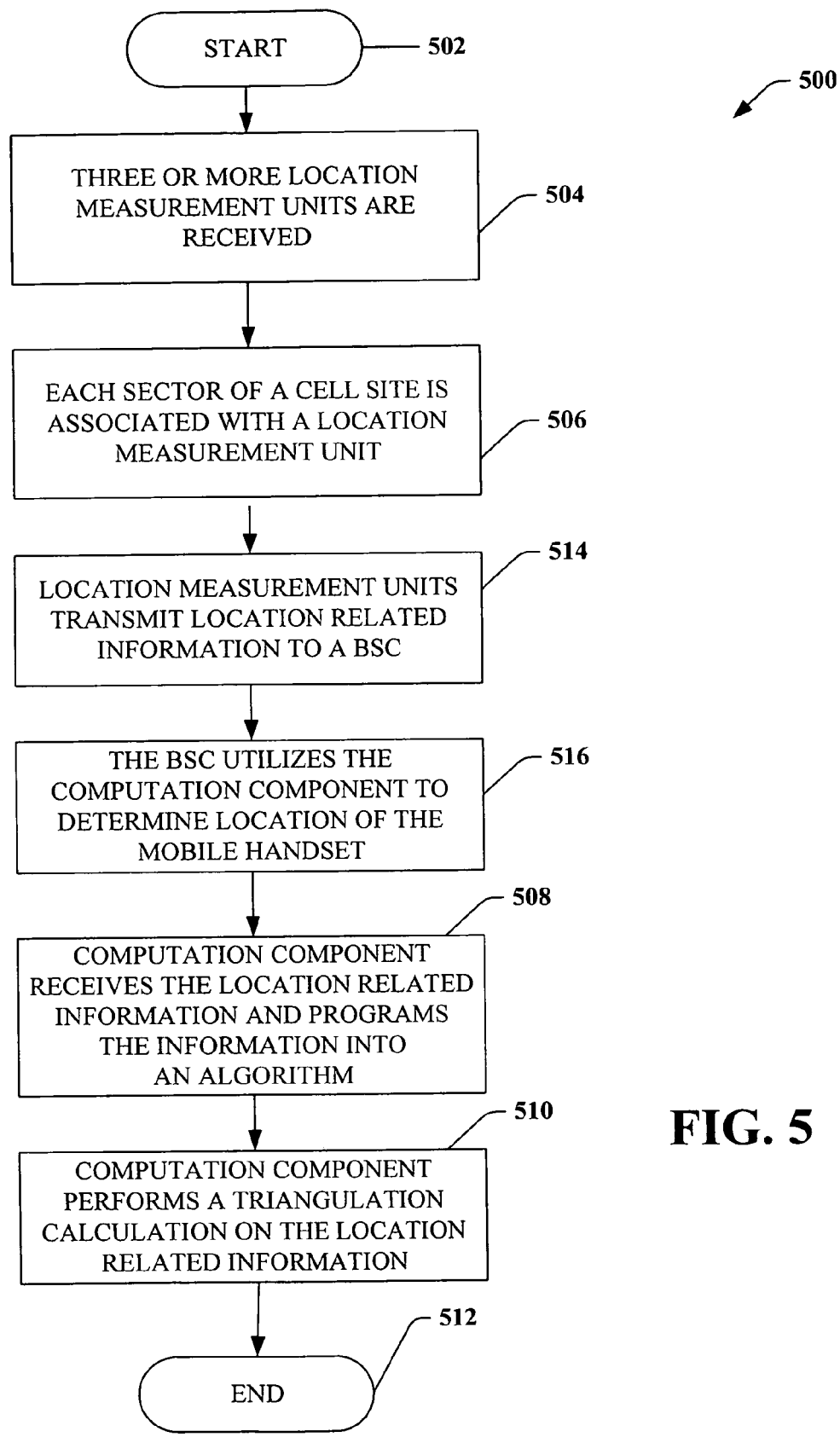
FIG. 5 is a flow diagram that is representative of a methodology for the location system, wherein a BSC communicates with the location measurement units to define the location of the mobile handset.

Referring to FIGS. 4-5, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 4, a methodology 400 for facilitating determination of a location of a mobile handset is illustrated. The methodology 400 begins at 402, and at 404 three or more location measurement units are received. At 406, each sector of one or more cell site(s) is associated with an LMU. For instance, a plurality of LMU's could be utilized with each cell site having 1, 3 or 6 sectors. Accordingly, each LMU corresponds to a sector of one or more cell site(s). The methodology 400 then proceeds to 408, where approximation of the location of the mobile handset is achieved by way of the computation component. The computation component receives location relating information from the three or more LMUs. The LMUs provide uplink capability and utilize TDOA technology to measure the time delays of signals from the mobile handset to the LMUs. The LMUs then transmit these measurements, i.e. location related information, to the computation component. At 410, the computation component performs a triangulation calculation on the location related information to determine the location of the mobile handset. The methodology 400 ends at 412.

Now turning to FIG. 5, a methodology 500 for facilitating determination of a location of a mobile handset utilizing a base system controller (BSC) is illustrated. The methodology 500 begins at 502, and at 504 three or more location measurement units are received. At 506, each sector of one or more cell site(s) is associated with an LMU. For instance, a plurality of cell sites could be utilized with each cell site having 1, 3 or 6 sectors. Accordingly, each LMU corresponds to a sector of one or more cell site(s). The methodology 500 then proceeds to 514, where the LMUs transmit location related information to a BSC. The LMUs provide uplink capability and utilize TDOA technology to measure the time delays of signals from the mobile handset to the LMUs. These timing measurements are defined as location related information. This location related information is then transmitted to the BSC. Further, at 506 the BSC utilizes the computation component to determine the location of the mobile handset. At 508 the computation component receives the location related information and programs the information into an algorithm that calculates the latitude and longitude of the mobile handset. At 510, the computation component performs a triangulation calculation on the location related information to determine the location of the mobile handset. The methodology 500 ends at 512.

Figure 6:
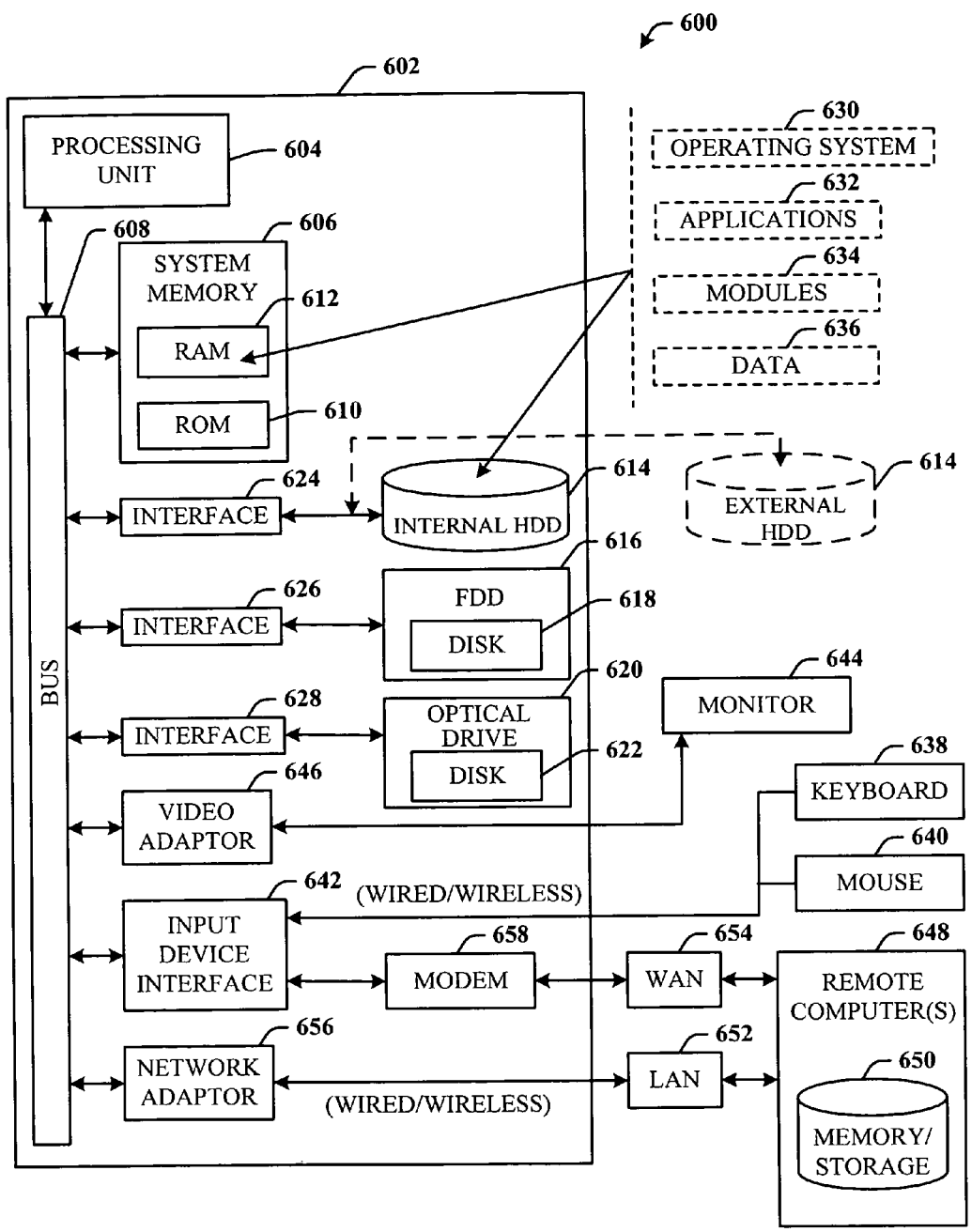
FIG. 6 is an exemplary computing environment that can be employed in connection with various aspects described herein.

Referring now to FIG. 6, there is illustrated a block diagram of a computer operable to provide storage and access such as for a UMA Network Controller and/or a Home Subscriber Server. In order to provide additional context for various aspects thereof, FIG. 6 and the following discussion are intended to provide a brief, general description of a suitable computing environment 600 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, the exemplary environment 600 for implementing various aspects includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 612, including an operating system 630, one or more application programs 632, other program modules 634 and program data 636. All or portions of the operating system, applications, modules, and/or data can also be cached in the RAM 612. It is to be appreciated that the innovation can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 7:
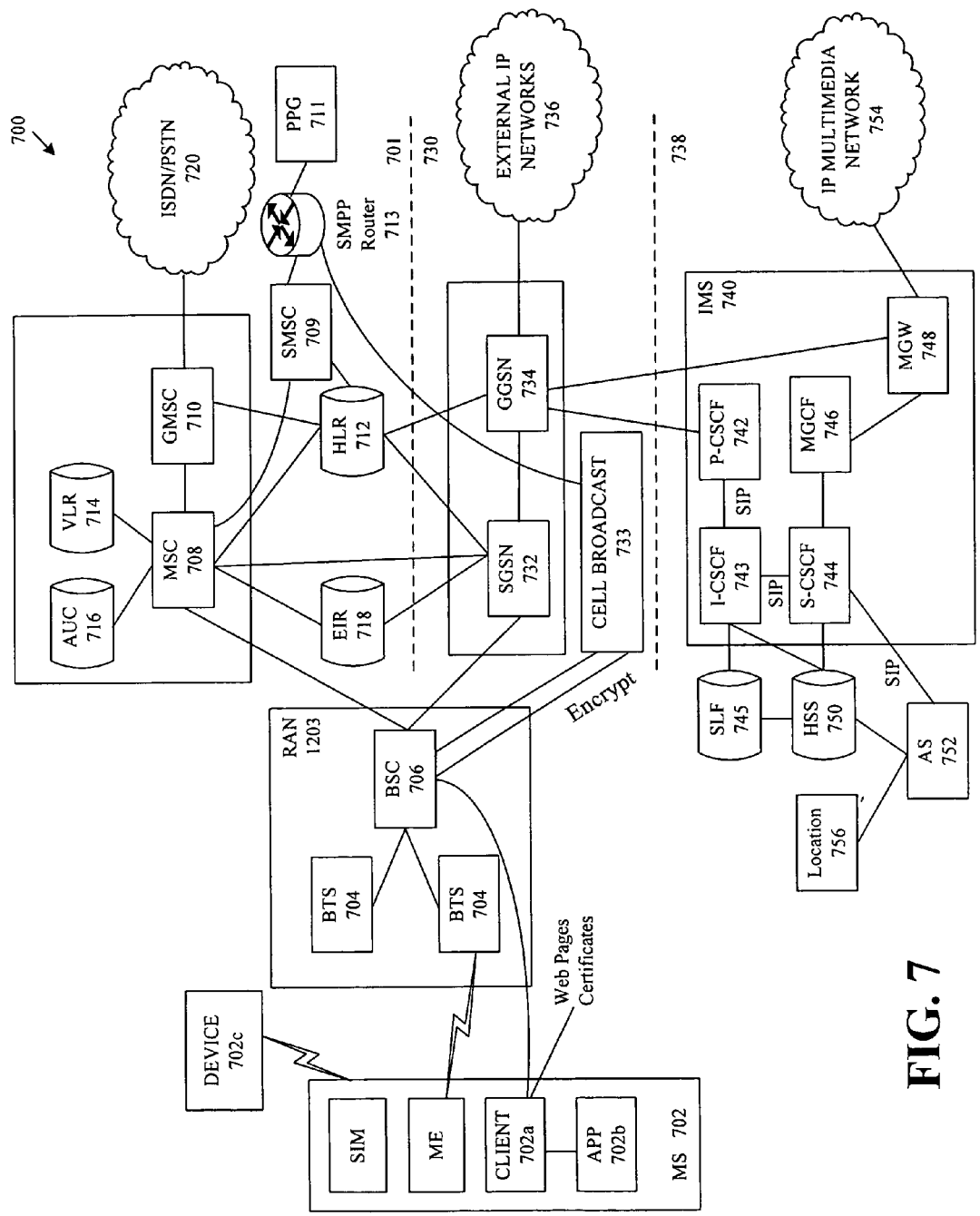
FIG. 7 is an exemplary networking environment.

Now turning to FIG. 7, such figure depicts a GSM/GPRS/IP multimedia network architecture 700 that includes a GSM core network 701, a GPRS network 730 and an IP multimedia network 738. The GSM core network 701 includes a Mobile Station (MS) 702, at least one Base Transceiver Station (BTS) 704 and a Base Station Controller (BSC) 706. The MS 702 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 702 includes an embedded client 702a that receives and processes messages received by the MS 702. The embedded client 702a may be implemented in JAVA and is discuss more fully below.

The embedded client 702a communicates with an application 702b that provides services and/or information to an end user. One example of the application may be navigation software that provides near real-time traffic information that is received via the embedded client 702a to the end user. The navigation software may provide road conditions, suggest alternate routes, etc. based on the location of the MS 702. Those of ordinary skill in the art understand that there are many different methods and systems of locating an MS 702.

Alternatively, the MS 702 and a device 702c may be enabled to communicate via a short-range wireless communication link, such as BLUETOOTH. For example, a BLUETOOTH SIM Access Profile may be provided in an automobile (e.g., device 702c) that communicates with the SIM in the MS 702 to enable the automobile's communications system to pull information from the MS 702. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 702c. There may be an endless number of devices 702c that use the SIM within the MS 702 to provide services, information, data, audio, video, etc. to end users.

The BTS 704 is physical equipment, such as a radio tower, that enables a radio interface to communicate with the MS. Each BTS may serve more than one MS. The BSC 706 manages radio resources, including the BTS. The BSC may be connected to several BTSs. The BSC and BTS components, in combination, are generally referred to as a base station (BSS) or radio access network (RAN) 703.

The GSM core network 701 also includes a Mobile Switching Center (MSC) 708, a Gateway Mobile Switching Center (GMSC) 710, a Home Location Register (HLR) 712, Visitor Location Register (VLR) 714, an Authentication Center (AuC) 718, and an Equipment Identity Register (EIR) 716. The MSC 708 performs a switching function for the network. The MSC also performs other functions, such as registration, authentication, location updating, handovers, and call routing. The GMSC 710 provides a gateway between the GSM network and other networks, such as an Integrated Services Digital Network (ISDN) or Public Switched Telephone Networks (PSTNs) 720. In other words, the GMSC 710 provides interworking functionality with external networks.

The HLR 712 is a database that contains administrative information regarding each subscriber registered in a corresponding GSM network. The HLR 712 also contains the current location of each MS. The VLR 714 is a database that contains selected administrative information from the HLR 712. The VLR contains information necessary for call control and provision of subscribed services for each MS currently located in a geographical area controlled by the VLR. The HLR 712 and the VLR 714, together with the MSC 708, provide the call routing and roaming capabilities of GSM. The AuC 716 provides the parameters needed for authentication and encryption functions. Such parameters allow verification of a subscriber's identity. The EIR 718 stores security-sensitive information about the mobile equipment.

A Short Message Service Center (SMSC) 709 allows one-to-one Short Message Service (SMS) messages to be sent to/from the MS 702. A Push Proxy Gateway (PPG) 711 is used to "push" (e.g., send without a synchronous request) content to the MS 702. The PPG 711 acts as a proxy between wired and wireless networks to facilitate pushing of data to the MS 702. A Short Message Peer to Peer (SMPP) protocol router 713 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 702 sends a location update including its current location information to the MSC/VLR, via the BTS 704 and the BSC 706. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 730 is logically implemented on the GSM core network architecture by introducing two packet-switching network nodes, a serving GPRS support node (SGSN) 732, a cell broadcast and a Gateway GPRS support node (GGSN) 734. The SGSN 732 is at the same hierarchical level as the MSC 708 in the GSM network. The SGSN controls the connection between the GPRS network and the MS 702. The SGSN also keeps track of individual MS's locations and security functions and access controls.

A Cell Broadcast Center (CBC) 733 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 734 provides a gateway between the GPRS network and a public packet network (PDN) or other IP networks 736. That is, the GGSN provides interworking functionality with external networks, and sets up a logical link to the MS through the SGSN. When packet-switched data leaves the GPRS network, it is transferred to an external TCP-IP network 736, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 738 was introduced with 3GPP Release 5, and includes an IP multimedia subsystem (IMS) 740 to provide rich multimedia services to end users. A representative set of the network entities within the IMS 740 are a call/session control function (CSCF), a media gateway control function (MGCF) 746, a media gateway (MGW) 748, and a master subscriber database, called a home subscriber server (HSS) 750. The HSS 750 may be common to the GSM network 701, the GPRS network 730 as well as the IP multimedia network 738.

The IP multimedia system 740 is built around the call/session control function, of which there are three types: an interrogating CSCF (I-CSCF) 743, a proxy CSCF (P-CSCF) 742, and a serving CSCF (S-CSCF) 744. The P-CSCF 742 is the MS's first point of contact with the IMS 740. The P-CSCF 742 forwards session initiation protocol (SIP) messages received from the MS to an SIP server in a home network (and vice versa) of the MS. The P-CSCF 742 may also modify an outgoing request according to a set of rules defined by the network operator (for example, address analysis and potential modification).

The I-CSCF 743 forms an entrance to a home network and hides the inner topology of the home network from other networks and provides flexibility for selecting an S-CSCF. The I-CSCF 743 may contact a subscriber location function (SLF) 745 to determine which HSS 750 to use for the particular subscriber, if multiple HSS's 750 are present. The S-CSCF 744 performs the session control services for the MS 702. This includes routing originating sessions to external networks and routing terminating sessions to visited networks. The S-CSCF 744 also decides whether an application server (AS) 752 is required to receive information on an incoming SIP session request to ensure appropriate service handling. This decision is based on information received from the HSS 750 (or other sources, such as an application server 752). The AS 752 also communicates to a location server 756 (e.g., a Gateway Mobile Location Center (GMLC)) that provides a position (e.g., latitude/longitude coordinates) of the MS 702.

The HSS 750 contains a subscriber profile and keeps track of which core network node is currently handling the subscriber. It also supports subscriber authentication and authorization functions (AAA). In networks with more than one HSS 750, a subscriber location function provides information on the HSS 750 that contains the profile of a given subscriber.

The MGCF 746 provides interworking functionality between SIP session control signaling from the IMS 740 and ISUP/BICC call control signaling from the external GSTN networks (not shown). It also controls the media gateway (MGW) 748 that provides user-plane interworking functionality (e.g., converting between AMR- and PCM-coded voice). The MGW 748 also communicates with other IP multimedia networks 754.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates determination of a location of a mobile handset, comprising:
  a location measurement unit, within a cell site comprising a single base station, configured to collect location related information corresponding to the mobile handset; and
  a base station controller further comprising:
    a computation component configured to approximate a location of the mobile handset, wherein the computation component is configured to receive the location related information from the location measurement unit and additional location related information from at least two other location measurement units within the cell site, and the computation component approximates the location via a triangulation operation that utilizes the location related information, wherein the triangulation operation is initiated by the computation component in response to detection of the location related information being received from the mobile handset at the location measurement unit and the at least two other location measurement units and wherein each location measurement unit corresponds to a sector of the cell site and the location measurement unit resides at least 0.5 miles from the at least two other location measurement units within the cell site.

2. The system of claim 1, wherein the base stations controller is configured to communicate with the location measurement unit and utilize the computation component to calculate at least one of latitude data and longitude data that defines the location of the mobile handset.

3. The system of claim 2, wherein the location measurement unit is configured to communicate with the base stations controller by way of microwaves.

4. The system of claim 1, wherein the location related information is time difference of arrival information.

5. The system of claim 1, wherein the location related information comprises angle of arrival information.

6. The system of claim 1, wherein the cell site comprises three sectors.

7. The system of claim 6, further comprising two additional cell sites, wherein the cell sites are arranged in a triangular pattern of three cell sites, and each of the three cell sites comprise three sectors that exhibit a 120 degree transmission pattern facing at least one of the sectors of other two cell sites of the three cell sites and a one mile line of site between each sector.

8. The system of claim 1, wherein the cell site comprises six sectors.

9. The system of claim 8, wherein there are three cell sites arranged in a triangular pattern, and each of the three cell sites comprises six sectors that exhibit a 60 degree transmission pattern facing at least one of the sectors of other two cell sites of the three cell sites and a one mile line of site between each sector.

10. The system of claim 1, wherein the cell site comprises an omni cell site with a single sector.

11. The system of claim 10, wherein there are three omni cell sites, and each of the three omni cell sites comprise one sector that exhibits a 360 degree transmission pattern and a one mile line of site between each sector.

12. The system of claim 1, wherein the location measurement unit is configured to be remotely accessed by a proxy.

13. The system of claim 1, wherein the cell site is a cellular communication tower comprising microwave transmitters and receivers.

14. The system of claim 1, wherein the cell site is associated with structures at least as large as a building.

15. A non-transitory computer readable storage medium comprising computer executable instructions that, in response to execution by a computing system, cause the computing system to perform operations, comprising:
  obtaining a signal from a mobile handset at a location measurement unit associated with a cell site comprising a single base station;
  producing location related information based at least in part on the signal;
  receiving the location related information from the location measurement unit and additional location related information from at least two additional location measurement units associated with the cell site;
  employing the location related information from the location measurement unit and the additional location related information from the at least two additional location measurement units associated with the cell site to determine a location of the mobile handset, wherein the location of the mobile handset is determined via a triangulation operation and wherein each location measurement unit corresponds to a sector of the cell site and the location measurement unit resides at least 0.5 miles from the at least two additional location measurement units associated with the cell site; and
  initiating the triangulation operation based on the location related information being received at the location measurement unit and the at least two additional location measurement units.

16. The computer readable storage medium of claim 15, the operations further comprising:
  determining latitude data and longitude data indicating the location of the mobile handset based upon the location related information received from the location measurement unit and the at least two additional location measurement units.

17. The computer readable storage medium of claim 16, wherein the receiving is by way of microwaves.

18. The computer readable storage medium of claim 15, wherein the location related information is time difference of arrival information.

19. A method comprising:
  receiving, at a base station controller, location related information from at least three location measurement units being located within a cell site comprising a single base station and associated with the base stations controller, the location related information pertaining to a location of a mobile handset located within the cell site and being based upon a measured arrival of a signal from the mobile handset at each of the at least three location measurement units and wherein each location measurement unit corresponds to a sector of the cell site and the at least three location measurement units with a distance of at least 0.5 miles separating one location measurement unit from an adjacent location measurement unit comprising the at least three location measurement units; and calculating, at the base stations controller, the location of the mobile handset located within the cell site; wherein the calculating is initiated in response to detecting arrival of a signal from the mobile handset at each of the at least three location measurement units and comprises triangulating the location related information being received from the at least three location measurement units.

20. The method of claim 19, wherein the receiving includes receiving by way of microwaves.

21. The method of claim 19, wherein the location related information includes time difference of arrival information.

22. The method of claim 19, wherein the triangulating includes calculating at least one of latitude data or longitude data.

23. The method of claim 19, wherein the cell site comprises three sectors.

24. The method of claim 19, wherein the receiving and calculating are performed continuously.

25. The method of claim 24, further comprising continuously provisioning, by the base stations controller, the location of the mobile handset to an external device requiring, from the base stations controller, information regarding the location of the mobile handset.

26. The method of claim 19, wherein the receiving the location related information includes receiving measurements relating to time difference of arrival.

27. The method of claim 26, wherein the calculating includes calculating using the measurements relating to time difference of arrival.

* * * * *